Patented Oct. 12, 1937

2,095,571

UNITED STATES PATENT OFFICE 2,095,571

ANTISEPTIC

Harry J. Nichols, Binghamton, N. Y.

No Drawing. Application March 5, 1937, Serial No. 129,266

6 Claims. (Cl. 167—62)

This application is a continuation in part of my copending application Serial No. 744,557, filed September 18, 1934.

This invention relates to an antiseptic preparation. This preparation, in the form of a solution, is particularly adapted to the treatment of the types of skin diseases classified as local skin diseases due to vegetable parasites.

The general object of the invention is to provide an efficient, clean, and inexpensive antiseptic preparation adapted for use as a home remedy with the utmost safety by following simple directions for its proper use.

In order that a clearer understanding of the present invention may be had and the objects sought to be accomplished, the type of skin disease which is particularly benefited by treatment with the preparation of the invention is technically known as tineal dermatitis, tineal infection, or ringworm, and is also popularly known as "athlete's foot." This particular skin disease is caused by varieties of fungus growing in the skin, thus producing irritation and sometimes sores. It is particularly apt to affect the interdigital skin of the feet and hands. While knowledge of this disease in its various forms is incomplete, it is believed that the fungus, similar in some respects to bread mold, grows in the skin and is propagated by spores which become imbedded in the skin. It is a remarkably resistant organism, it being stated by some authorities that it takes at least fifteen minutes of boiling to destroy samples of isolated spores. While the exposed fungus organism may be destroyed by a number of known chemicals, the eradication of such organisms when implanted and imbedded in the human skin is very difficult, and hence severe cases of tineal infection are common, and are said by medical authorities to be increasing rapidly.

A further difficulty in the treatment of tineal infections is presented by the fact that continued treatments (which may be initially partly successful) such as by X-ray and ultraviolet-ray radiations, or the application of strong antiseptics, may produce irritation of the skin, abnormal thickening and cracking of the epidermis, and in some cases, burn-like lesions. In such instances, the original condition of tineal infection may be complicated by dermatitis resulting from improper or too drastic treatment. In other instances, callouses and soft corns are produced by improper treatment. Furthermore, the course of the disease may be complicated by infection with other organisms of non-vegetable classification.

The satisfactory treatment of tineal infection involves the steps of killing the fungus or vegetable parasite, maintaining the site of the infection in antiseptic condition, removing the superficial epidermis which harbors the spores of the parasite, and restoring the skin to a normal, healthy condition while saving the patient discomfort and pain, and avoiding the possibility of producing dermatitis or other abnormal skin conditions during a prolonged course of treatment.

It is therefore one of the main objects of the present invention to provide a non-toxic, non-irritating antiseptic preparation which is effective in eradicating tineal and like infections of the skin, and which may be used for a prolonged course of treatment without producing adverse abnormal conditions of the skin area being treated.

The antiseptic preparation embodying the invention is also effective in treating soft corns, ingrown toe nails, and is a general antiseptic in the external treatment of skin diseases.

It has heretofore been proposed to use solutions or ointments containing salicylic acid in various proportions in the treatment of tineal infections, and some success has been obtained by some of such compounds, as for example by Whitfield's ointment. However, salicylic acid is normally absorbed only to a very limited extent by the human skin, and its use in ointments with oils, fats, gelatine or like unguents is comparatively inefficient, since such compounds render the skin practically impermeable to the salicylic acid. On the other hand, attempts to use stronger and more efficacious concentrations of salicylic acid have heretofore failed because, lacking a suitable menstruum for the salicylic acid, the irritation of the skin has been increased with repeated applications inducing dermatitis venenata. For example, when salicylic acid is used in solution in concentrated ethyl alcohol, or in ethyl alcohol and water, its absorption by the skin is not facilitated in an efficient manner and acute soreness of the infected area due to drying out and hardening of the epidermis is the usual result during prolonged treatment of chronic tineal infections.

It is therefore a further object of the present invention to improve and aid the beneficial action of salicyclic acid as an ingredient in skin disease remedies by augmenting its beneficial properties and minimizing its disadvantages. This is accomplished in the invention by modifying the normal action of salicylic acid by the cooperation of proper solvent additions. It has been stated upon authority that salicylic acid is the strongest known antiseptic agent which may be applied to the human skin without producing toxic effects. Salicylic acid in weak solution acts as an inhibitor of fungus growth, and in stronger solution acts as a fungicide. Normally, salicylic acid is not absorbed by the skin, but it rapidly kills the cells of the epidermis without affecting the immediately subjacent cells of the dermis or true skin. This action of destroying the cells of the epidermis may cause pain and discomfort unless properly alleviated.

Thus a further object of the invention is to modify the normal non-absorptive action of salicylic acid, and to accelerate its endermic absorption and its action of removing the superficial epidermis, without, however, causing pain.

Other objects will be in part obvious and in part hereinafter pointed out in connection with the following analysis of this invention.

I find that a solution of hydrous ethyl alcohol and glycerine in certain proportions softens and conditions the skin so that salicylic acid is more readily absorbed. Also that the escharotic action of the salicylic acid is rendered more efficient, without causing soreness or pain, when the salicylic acid is used in combination with a suitable glycerine solution. I prefer to use ethyl alcohol, or a mixture of ethyl alcohol and water, as a preliminary menstruum for the salicylic acid, since salicylic acid is virtually insoluble directly in glycerine. This menstruum is compatible chemically and therapeutically with the glycerine and salicylic acid. The preferred embodiment of the preparation of the invention includes a solution of salicylic acid in a composite solvent of hydrous ethyl alcohol and glycerine, with or without the addition of other ingredients of antiseptic, non-irritating, non-toxic nature.

Since 100 cc. of absolute alcohol will dissolve approximately 50 grams of salicylic acid, the compound may be prepared in concentrated form, and diluted with water or hydrous alcohol. As applied for use, however, for best results with safety the percentage by weight of salicylic acid should not exceed 10% of the composite solvent, the percentage by volume of alcohol should not be less than 30% nor more than 90% of the hydro-alcohol solvent and the percentage by volume of glycerine should not be less than 15% nor more than 50% of the other solvents.

The preferred strength for the hydrous alcohol is 60% to 70% by volume since, in general, lesser strengths reduce the germicidal action of the solution and greater strengths tend to dry out and harden the skin as previously mentioned, although this effect is ameliorated to some extent by the glycerine. When alcohol of this strength is used in preparing the solution, no water need be added. The principal function of the alcohol, besides its germicidal effect, is to facilitate the solution of the salicylic acid in the glycerine which is otherwise practically insoluble therein. Hence the content of alcohol in the solution can be varied over a considerable range provided the proper content of glycerine and salicylic acid is maintained.

I have found that, in general, if the percentage by weight of salicylic acid is less than 3% of the composite solvent, the preparation will be found inefficient in treating chronic infections or those located where the skin is relatively thick. On the other hand, if the content of the salicylic acid exceeds 10%, the solution may be found harmful to persons with sensitive skins. Glycerine in the range of substantially one-fifth to two-fifths of the hydrous alcohol is found to give optimum results in conditioning the skin for treatment and for restoring it to normal, healthy condition.

Therefore, without limiting myself to a particular formula, good results with safety may be obtained when the three main ingredients are varied within the following range:

| | | |
|---|---|---|
| Hydrous ethyl alcohol (30% to 90%) | c. c. | 60 to 100 |
| Glycerine | c. c. | 20 to 40 |
| Salicylic acid | grams | 4 to 12 |

In preparing one form of the preparation which gives good results yet provides a good margin of safety to the patient and is therefore suitable as a home remedy, I prefer to use the following three main ingredients in substantially the following proportions:

| | | |
|---|---|---|
| Hydrous ethyl alcohol (70%) | c. c. | 90 |
| Glycerine | c. c. | 25 |
| Salicylic acid | grams | 5 |

The ingredients should preferably be of the standard of purity specified in the United States Pharmacopeia.

Various minor additions may be made to the above formulae in order to adapt the base preparation to particular skin diseases, or to the particular condition of individual patients. In making such additions, which should preferably be limited to small percentages since they are not essential to the preparation, care must be exercised that the additive ingredients are compatible chemically with the essential ingredients, and are not of such nature as to cause irritation of the skin on repeated application. Vegetable compounds should in general be avoided, since such compounds may be precipitated or chemically altered in time.

The aromatic acids and their derivatives are as a group antiseptic without being toxic to man; thus benzoic acid, benzoin, thymol, chlorthymol, menthol, colmenthol, and hexylresorcinol are, among others, compounds from this group which constitute suitable additions to the base preparation. Because of its soothing and sedative properties, menthol and its derivative, colmenthol, may serve as beneficial additions to the preparation. Also, a non-toxic, local anesthetic ingredient, such as chlorbutanol, anesthesin, etc. may be desirable in some cases to deaden the pain on application of the preparation to raw or inflamed areas.

A formula which produces good results is:—

| | | |
|---|---|---|
| Ethyl alcohol (70%) | c. c. | 90 |
| Glycerine | c. c. | 30 |
| Salicylic acid | grams | 5 |
| Menthol | grams | 1-2 |
| Chlorbutanol | grams | 1-5 |

Another formula which produces good results, particularly in cases where the tineal infection is accompanied by blisters and severe itching is:—

| | | |
|---|---|---|
| Ethyl alcohol (70%) | c. c. | 100 |
| Glycerine | c. c. | 20 |
| Salicylic acid | grams | 5 |
| Boric acid | grams | 1-5 |

A pure grade of borax may be substituted for boric acid in the above formula. The addition of the boric acid alleviates itching, and in combination with the other ingredients is an effective antiseptic.

In preparing the compounds of the invention, the ingredients should preferably be mixed as follows:

The salicylic acid and other solid ingredients, if used, are added to the alcohol and stirred thoroughly. Salicylic acid dissolves very rapidly in alcohol, boric acid less rapidly. As soon as the solid ingredients are dissolved, the glycerine is stirred into the mixture. The order of mixing is not particularly important, but the solution of the solid ingredients is facilitated by the order of mixing given.

The compound is quite stable in character and may be kept in a closed container indefinitely without change or deterioration.

Good results have been obtained by a course of treatment, as follows:—

The compound is applied freely to infected parts night and morning (and after bathing) with a tuft of absorbent cotton or other convenient absorbent material. The treatment is normally continued for five to seven days, during or after which period the superficial epidermis will peel off naturally, leaving healthy skin underneath. In chronic cases of long standing, the skin may be thick and leathery, in which case a second course of treatment may be necessary, a rest period preferably being allowed between courses of treatment. In cases where raw areas are exposed, it may be advisable to limit the treatment initially to one application a day, preferably before retiring for the night, until the soreness and itching disappear, after which the regular treatment may be resumed. As is well known, persons differ in their reaction to chemicals applied to the skin, and where unusual susceptibility to irritation is known, the compound should initially be diluted with equal parts of water. The compound is partly effective even when so diluted, but naturally a longer period is required to accomplish the exfoliating process; hence in most cases treatment with the full strength solution is to be preferred.

The compound is particularly suitable for a home remedy since successful results are readily obtained from simple directions for treatment, and no permanent harm can result from over zealous use.

From the above it will be seen that the present invention provides a simple and practical compound adapted to accomplish, among others, all the objects herein described.

What is claimed is:—

1. An antiseptic solution particularly for use in the treatment of skin diseases due to vegetable parasites, containing a composite hydrous solvent including hydrous ethyl alcohol and glycerine in proportions of substantially 3 to 1, in which approximately 4 to 8 grams of salicylic acid are dissolved in approximately each 100 c. c. of solvent.

2. An antiseptic solution for use in the treatment of skin diseases due to vegetable parasites including a composite solvent of approximately 70% hydrous ethyl alcohol and glycerine in the approximate ratio of 3 to 1, and salicylic acid dissolved in said solvent in the proportion of approximately 4 to 8 grams of approximately each 100 c. c. of solvent.

3. An antiseptic solution particularly for use in the treatment of skin diseases due to vegetable parasites, containing a composite hydrous solvent of substantially 100 c. c. of 30%–90% hydrous ethyl alcohol for each 20 to 40 c. c. glycerine, in which are dissolved approximately 4 to 8 grams salicylic acid.

4. An antiseptic solution particularly for use in the treatment of skin diseases due to vegetable parasites, containing a composite hydrous solvent of substantially 100 c. c. of 30%–90% hydrous ethyl alcohol for each 20 to 40 c. c. glycerine in which are dissolved approximately 4 to 8 grams salicylic acid and to which is added a non-toxic local anesthetic ingredient.

5. An antiseptic solution particularly for use in the treatment of skin diseases due to vegetable parasites containing a composite hydrous solvent of substantially 100 c. c. of 30%–90% ethyl alcohol for each 20 to 40 c. c. of glycerine in which are dissolved approximately 4 to 8 grams of salicylic acid and minor additions of non-toxic, antiseptic and sedative aromatic acids or derivatives thereof.

6. An antiseptic solution particularly for use in the treatment of skin diseases due to vegetable parasites containing a composite hydrous solvent including hydrous ethyl alcohol and glycerine in proportions of substantially 5 to 1 in which is dissolved salicylic acid to a content of 5% to 10% by weight and boric acid to a content of 1% to 5% by weight of the solvent.

HARRY J. NICHOLS.